Aug. 13, 1963

F. MAY ETAL 3,100,520

TIRE CHANGING MACHINE

Filed Feb. 2, 1959

5 Sheets-Sheet 1

INVENTORS
FRED MAY & GEORGE MAY
BY
Barnes, Kisselle, Raisch & Choate
ATTORNEYS

Aug. 13, 1963  F. MAY ETAL  3,100,520
TIRE CHANGING MACHINE
Filed Feb. 2, 1959  5 Sheets-Sheet 2
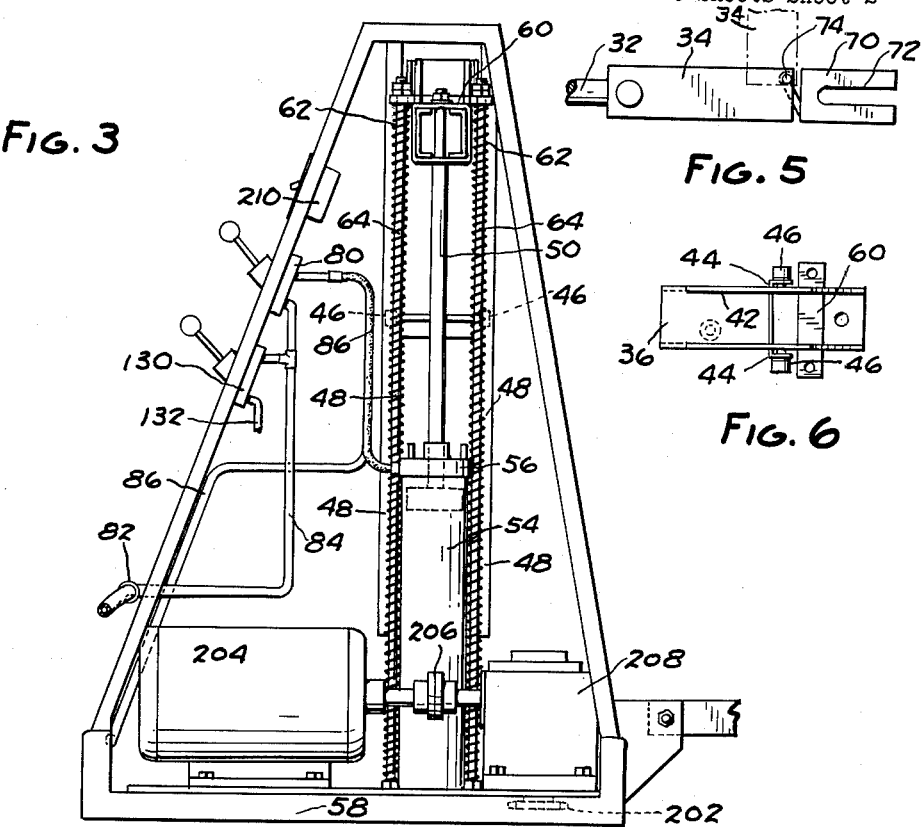
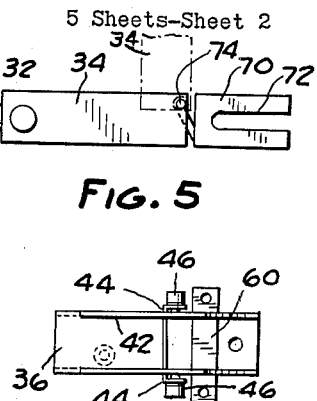
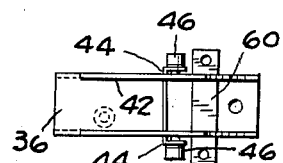
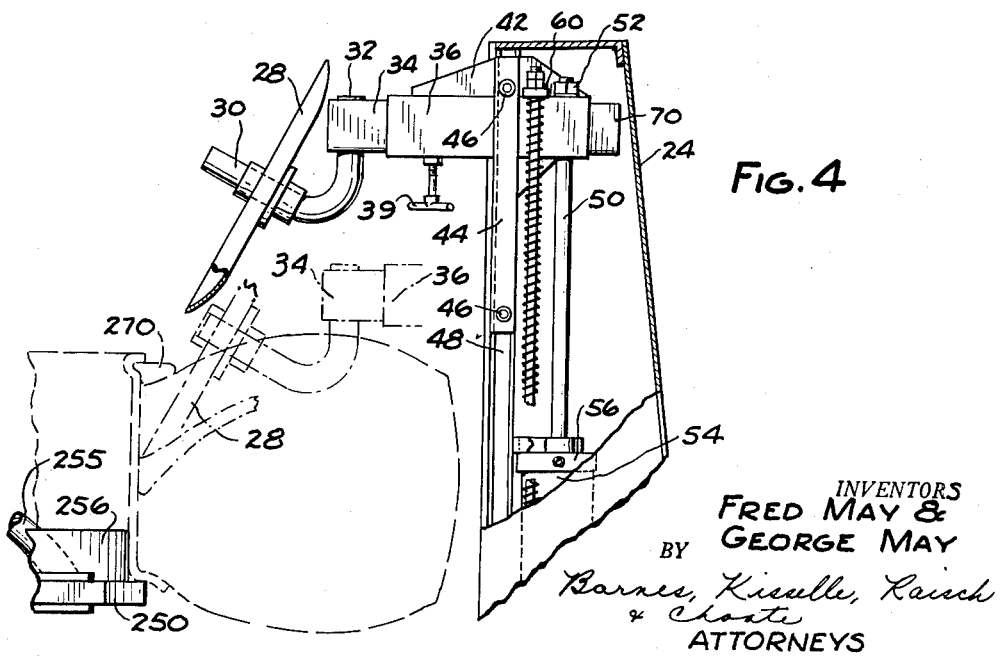
INVENTORS
FRED MAY &
GEORGE MAY
BY Barnes, Kisselle, Raisch & Choate
ATTORNEYS INVENTORS
FRED MAY & GEORGE MAY
BY
Barnes, Kisselle, Raisch & Choate
ATTORNEYS Aug. 13, 1963 F. MAY ETAL 3,100,520
TIRE CHANGING MACHINE
Filed Feb. 2, 1959 5 Sheets-Sheet 5
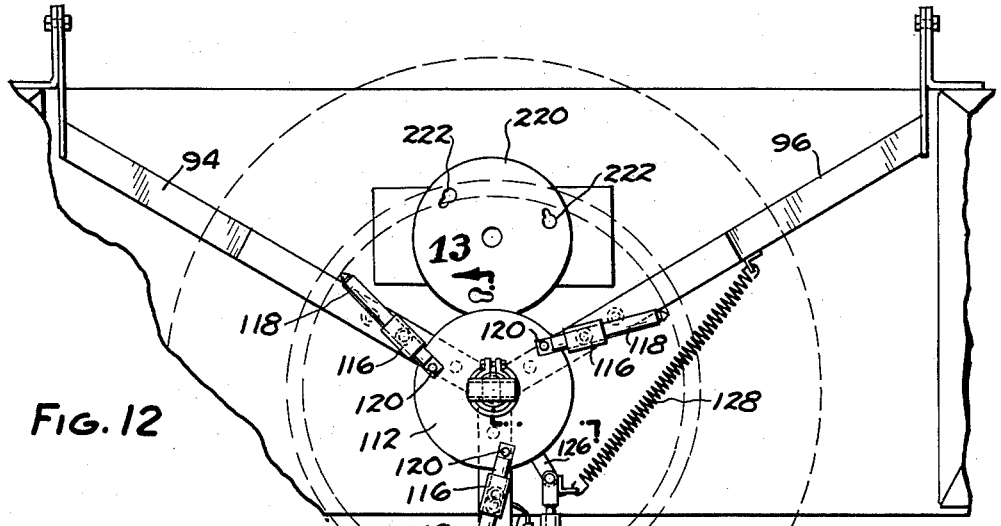
FIG. 12
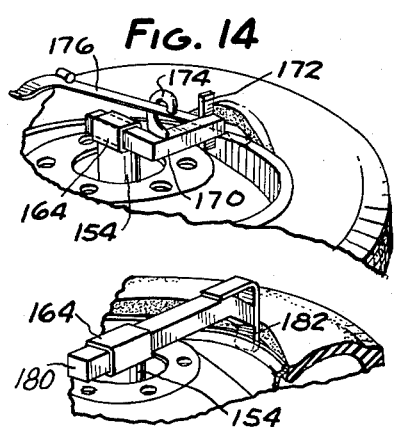
FIG. 14
FIG. 15
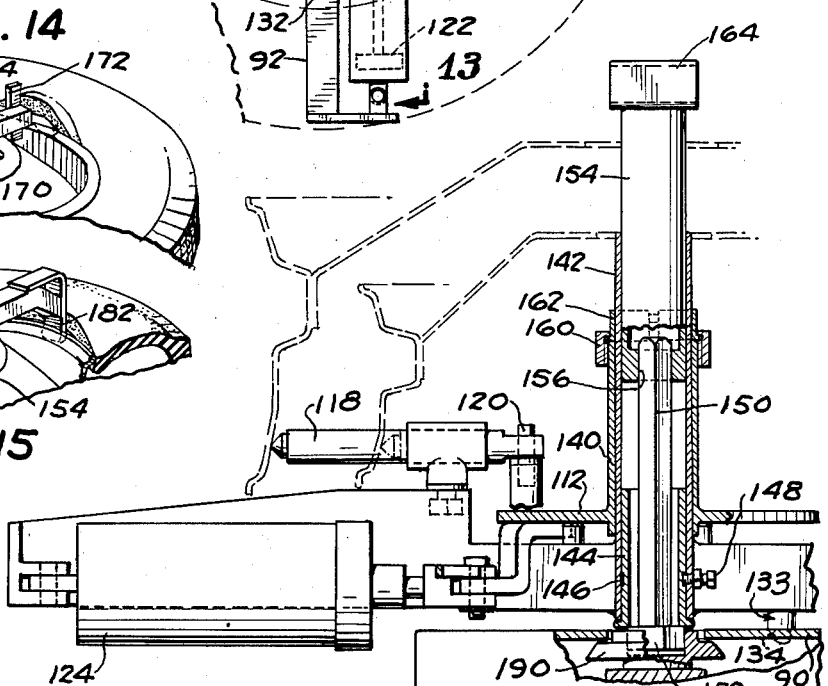
FIG. 13
INVENTORS
FRED MAY & GEORGE MAY
BY
Barnes, Kisselle, Raisch & Choate
ATTORNEYS

United States Patent Office 3,100,520
Patented Aug. 13, 1963

3,100,520
TIRE CHANGING MACHINE
Fred May and George May, Wyandotte, Mich., assignors, by mesne assignments, to FMC Corporation, San Jose, Calif., a corporation of Delaware
Filed Feb. 2, 1959, Ser. No. 790,558
3 Claims. (Cl. 157—1.24)

This invention relates to a tire changing machine and is particularly adapted to the changing of large vehicle tires for trucks, buses, tractors and earth moving equipment. These tires are extremely heavy and difficult to handle. In addition they tend to lock up on the rims so that they cannot be released by the ordinary methods of pounding and jumping that will work on small passenger car tires.

It is an object of the present invention to provide a tire changing machine which is convenient in operation and which requires very little effort on the part of the operator, the difficult work being performed by the machine itself.

It is also an object of the invention to provide a machine which is adaptable both to tubeless tires and tube tires and one which is adaptable to varying sizes of wheels and tires.

Other objects and features of the invention relating to the details of construction and operation will be apparent in the following description and claims.

Figure 1:
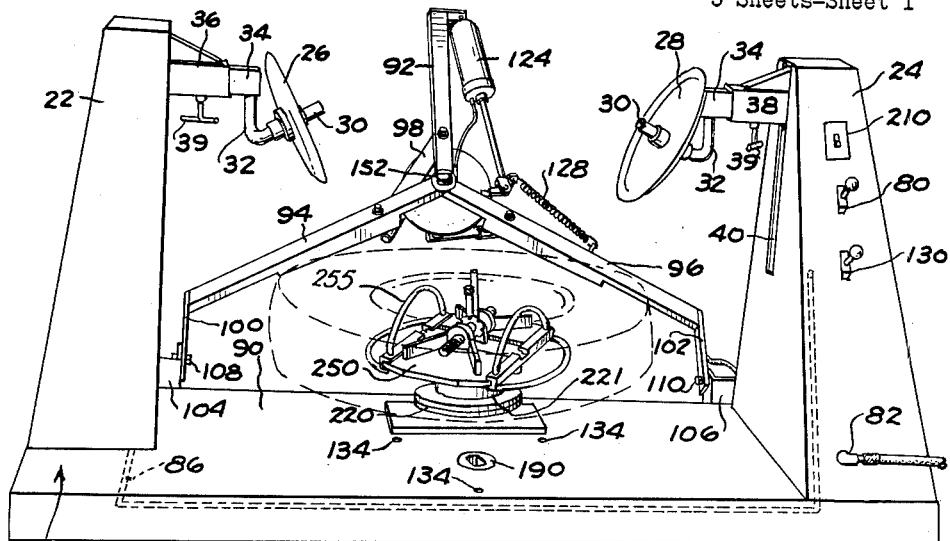

Drawings accompany the disclosure and the various views thereof may be briefly described as:

FIGURE 1, a front perspective elevation of the machine as used with tube tires.

Figure 2:
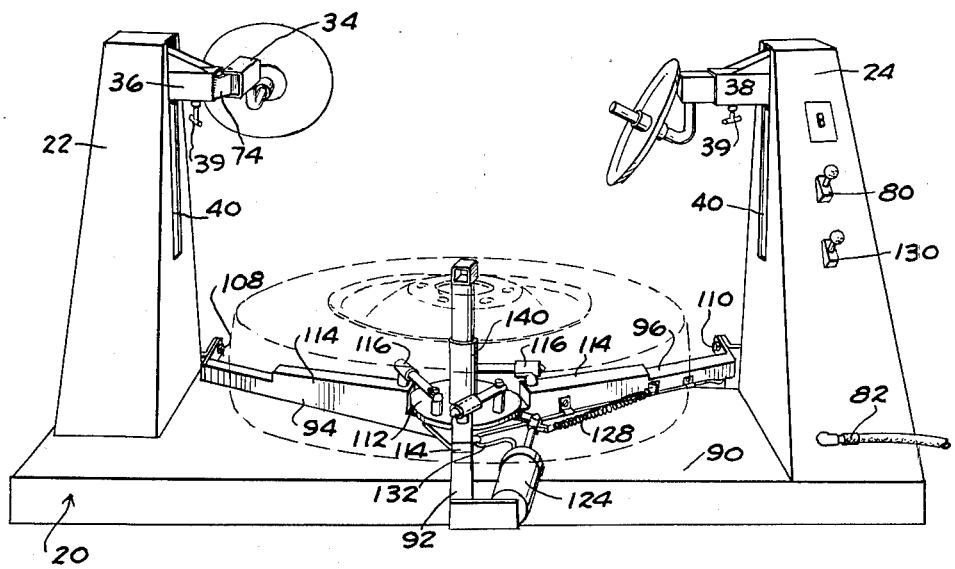

FIGURE 2, a similar view of the machine showing the mechanism adapted to tubeless tires.

FIGURE 3, a view of the right-hand end of the machine showing the outside cover removed to disclose the mechanism.

FIGURE 4, a view of the right-hand pillar of the machine with the front plate broken away to show the working part.

FIGURE 5, a plan view of the disc carrier arm.

FIGURE 6 a plan view of the guide for the disc carrier.

Figure 7:
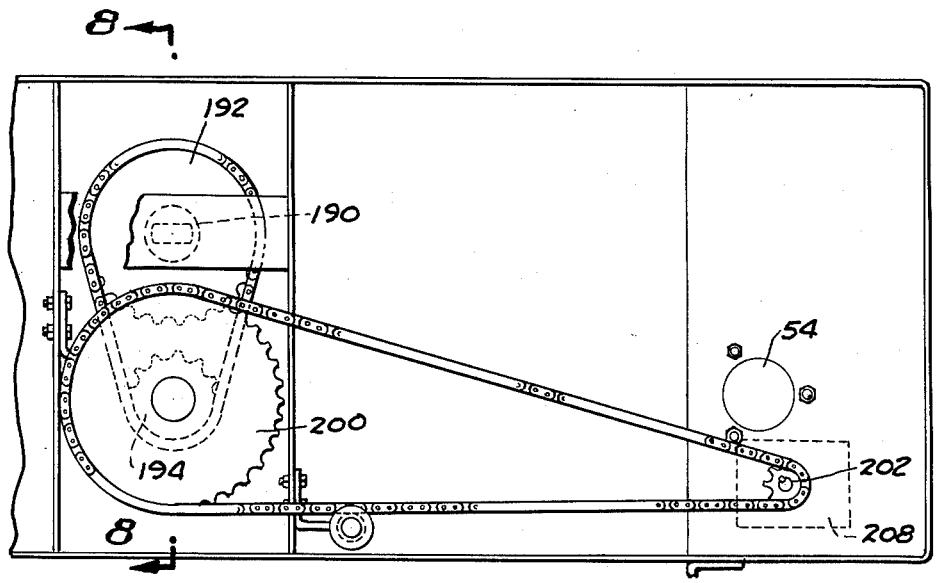

FIGURE 7 a bottom view of the machine base showing the chain drive mechanism.

Figure 8:
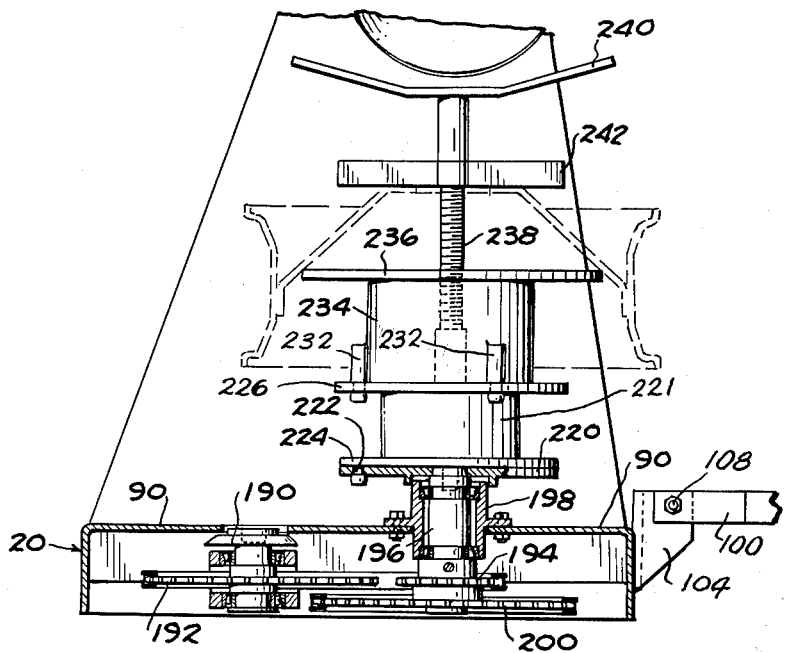

FIGURE 8, a center vertical section of the working parts taken on the base of the machine on line 8—8 of FIGURE 7.

Figure 9:
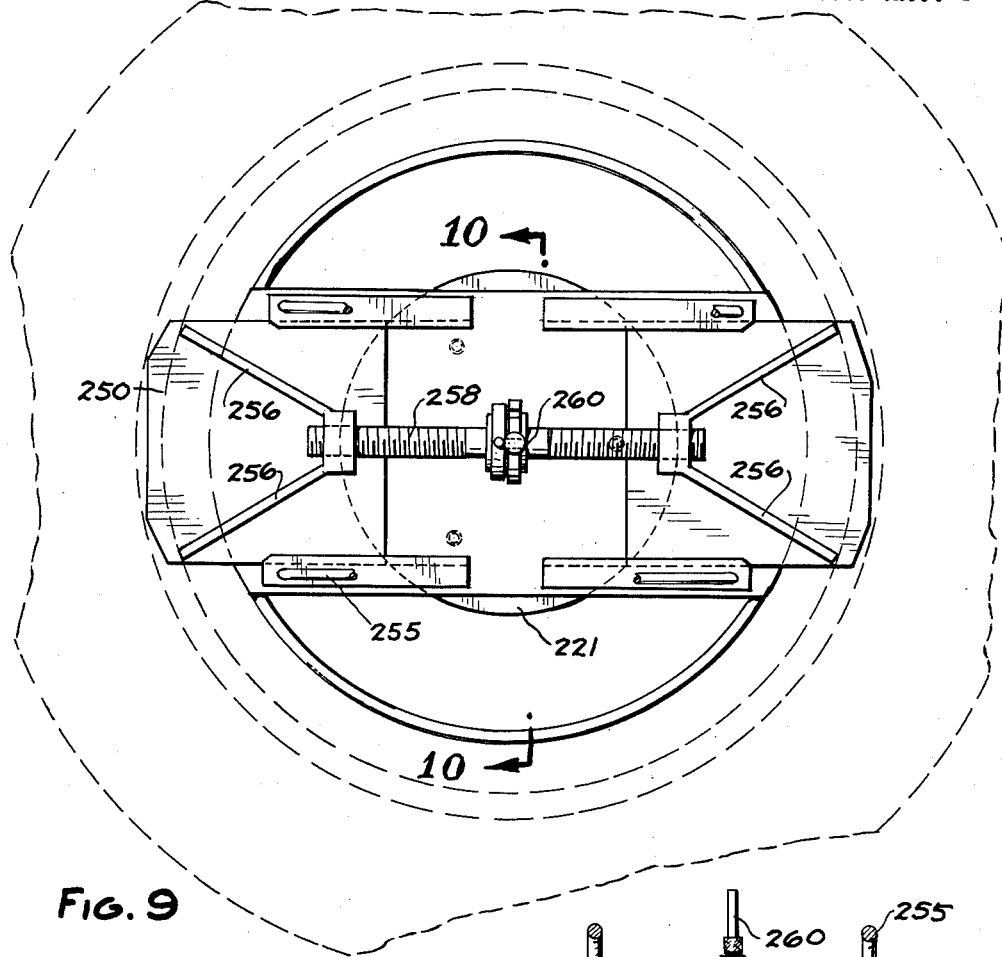

FIGURE 9, a plan view of the rim clamp shown in FIGURE 1.

Figure 10:
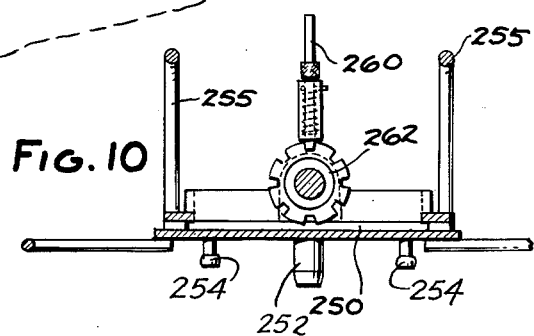

FIGURE 10, a sectional view on line 10—10 of FIGURE 9.

Figure 11:
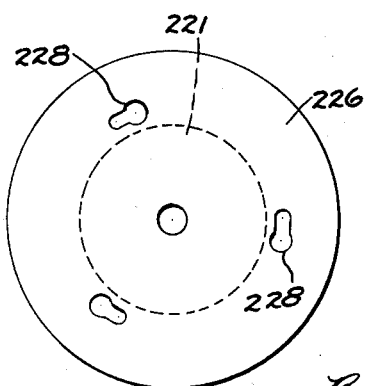

FIGURE 11, a plan view of a spacer unit shown in side elevation in FIGURE 8.

FIGURE 12, a plan view of the frame shown in FIGURE 2 used for tubeless tires.

FIGURE 13, a sectional view of the locking mechanism for tubeless tires taken on line 13—13 of FIGURE 12.

FIGURE 14, a view of a tire removal tool.

FIGURE 15, a view of a tire replacing tool.

Referring to the drawings, in FIGURES 1 and 2 the basic machine is shown with a base housing 20, a left-hand column or pillar 22 and a right-hand column or pillar 24. The space between the pillars is open to receive the wheel and tire and suitable clamping mechanisms, which will be later described, are provided on this space. The pillars are provided each to support respectively tire removing discs 26 and 28 mounted on an angled axial bar 30 having a vertical arm 32 rigidly suspended in a square slide 34 adjustably mounted in disc carrier brackets 36 and 38. Screws 39 lock the slides 34 in the brackets. The disc carrier brackets 36 and 38 are mounted for vertical motion in the pillars 22 and 24 respectively.

The pillars 22 and 24 are each provided with vertical slots 40 through which the carrier brackets 36 and 38 project. The carrier brackets comprise a square housing having a reinforcing construction plate 42 at the top. On the sides of the housing, vertical bars 44 are affixed, these bars carrying rollers 46 adapted to run in U-shaped roller tracks 48 at the edges of the slots 40 for vertical sliding motion. The housings 36 and 38 project into the pillars 22 and 24 and the inner end is transfixed by a piston rod 50 held on by a nut 52. A piston on the lower end of the rod 50 is slidably housed in a cylinder 54 having a head 56 through which the rod passes. The cylinder is affixed to the base plate 58 and the track lies in front of the cylinder as shown in FIGURE 4.

On the top of the brackets 36 and 38 is a yoke 60 extending to either side of the brackets for the attachment of return springs 62 acting on rods 64. These return springs can also consist of a spring anchored at the base 58 and connected to a cable and pulley mounted at the top of the housing to transmit the upward return force. In FIGURE 5 the square slide member 34 is shown having a slotted rearward extension 70 with a slot 72 for accommodating the cylinder rod at the rear end of the brackets. The slides 34 which operate in the brackets 36 and 38 are hinged as shown at 74 to permit the slides to be swung back as shown at the left of FIGURE 2.

The disc carrier brackets 36 and 38 are thus mounted for vertical motion in the pillars, a pneumatic circuit with a suitable pressure source being utilized to furnish fluid under pressure to the pillars to force them down against the action of the springs in the manner which will be described in greater detail in connection with the tire removal action.

A valve 80 directs air pressure from a source line 82 and a supply line 84 to a line 86 leading to the top of the cylinder 54. The construction of the cylinders is the same on each side of the unit and the operation of the cylinder in the left-hand pillar 22 would be identical, the line 86 being extended through the base to the left-hand pillar 22 and a corresponding cylinder 54 in that pillar.

The base housing 20 has a top plate 90 which extends between the pillars under a clear area for tire and wheel supports. In FIGURES 1 and 2 a frame support for a tubeless tire is composed of arms 92, 94 and 96 fastened together at a center point reinforced by a cross-bar 98. Arms 94 and 96 have short, rigid extensions 100 and 102 pivoted at the back of base 20 to angles 104 and 106 on pivots 108 and 110. A lever disc 112 is pivotally mounted at the center of these arms each of which has a riser 114 carrying an eye 116 slidably receiving bolts 118 pivotally anchored on disc 112 by pins 120. Disc 112 is controlled by an air piston 122 in cylinder 124 acting on lug 126 also connected to a return spring 128. Air pressure through a valve 130 in the right pillar will direct pressure through tube 132 to piston 122 to cause clockwise rotation of disc 112 and an outward motion of shot bolts 118 to center and chuck a wheel as shown in FIGURES 2 and 12, 13. Release of air pressure permits release spring to return the disc to the in-position of the bolts. Each arm 92, 94, 96 has a pilot bolt 133 on the bottom to locate in a pilot hole 134 in base plate 90. See FIGURE 13.

As shown in FIGURES 2 and 13, center disc 112 has a riser tube 140 carrying a bearing tube 142 which is welded to the inner ends of the arms 92, 94 and 96. At the lower end of tube 142 is a collar tube 144 located vertically by a groove 146 and a lock bolt 148. Within collar tube 144 is a square shaft 150 having a rectangular end 152 welded to tube 144 so the square shaft will turn with tube 144. Telescoping inside tube 142 is a drive tube 154 having a square hole 156 at the bottom end to slide on shaft 150. A slip collar 160 with a split ring 162 to lock it vertically is provided around tube 154 to locate it at varying heights, as shown in FIGURE 13, to accommodate the device to different size wheels rims. Across the top of tube 154 is a drive block 164 with a transverse square hole to receive a tool as shown in FIGURES 14 and 15. In FIGURE 14 the removing tool comprises an L-shaped bar 170 having a drive plate 172 and a hook 174 for the iron 176. The iron is driven in between the tubeless tire and the wheel rim and then pried down and hooked under hook 174. Shaft tube 154 is then turned by a power mechanism to be described and the upper edge of the tire removed. The same operation is repeated for the lower edge of the tire.

The replacement tool shown in FIGURE 15 is used to force the beads on the wheel rims in the same manner. It consists of a square shaft 180 having a hooked end 182.

The power mechanism for driving the irons described comprises, first, a rotating socket 190 in the base plate 90, FIGURES 1 and 13, driven by a chain gear 192 below the plate 90 in the base 20. Gear 192 is suitably mounted in bearings and driven by a gear 194 on shaft 196 mounted in a collar 198 on plate 90. Also on shaft 196 is a chain gear 200 receiving motion from a gear 202 below right pillar 24. Gear 202 is driven by a motor 204 acting through a coupling 206 and an angle drive and gear reducer 208. A motor switch 210 is mounted on pillar 24.

As shown in FIGURE 8, the shaft 196 projects upwardly from collar 198 to support and rotate a plate 220 having key holes 222. It will be observed that the speed ratios of the rotating socket 190 and the rotating plate 220 will vary, the speed of the socket 190 being about one-half that of the plate.

Tube tires which are still used extensively especially in trucks, require a different treatment and the machine is adapted to receive these tires on a rotating chuck shown in FIGURES 1, 8 and 9. The chuck is mounted either on plate 220 or on a spacer unit 221 having a bottom plate 224 with mushroom pins to engage the holes of plate 220 and with a top plate 226 having key holes 228, FIGURE 11.

One type of tube tire wheel holder for disc wheels consists of a drum 234, FIGURE 8, having axially extending mushroom pins 232 to engage the key holes 222 of plate 220 or the key holes 228 of spacer 221. Above the drum 234 is a top plate 236 which receives a threaded bolt 238 actuated by a capstan lever 240. A lock bar 242 clamps the top of the wheel center when bolt 238 is turned down.

A second type of tube tire wheel holder for separate rim type wheels is shown in FIGURES 1, 9 and 10. This consists of a plate 250 with a center locator pin 252 and mushroom pins 254 for interlock with the drive plate 220 or the spacer unit 221. Plate 250 has arched bars 255 to guide a rim into place and horizontal hoops to support the rims from tipping. Opposed jaws 256 are mounted to slide on the plate controlled by a common drive screw 258 rotated by a capstan type handle 260 acting in notches in a capstan wheel 262 the screw being suitably mounted on the plate. The ends of the plate 250 serve as a support ledge for the rim.

In the operation of the tube tire demounting device, the wheel is clamped on the rim holder and the discs 26 and 28 can be lowered pneumatically as previously described to contact and loosen the bead at the top. The lock ring or bead which is used on many of these tires is then removed and the rim clamping device can be loosened and the tire inverted. The loosening discs 26 and 28 are again lowered into contact to loosen the other bead of the tire so that tire can then drop off of the rim.

As shown in FIGURE 4 the rim and tire are in place and suitably clamped by the jaws 256 on the support 250. Air has been admitted to the top of cylinder 54 and the disc 28 is lowered so that its edge moves in between the tire bead and the lock ring 270 pushing the tire down and making it possible to remove the ring 270. It will be noted that the disc can slide inward or outward on its spindle 30 and the pressure causes this camming action against the angled spindle allowing the disc to move outwardly or inwardly radially of the tire. After the operation has reached the stage shown in FIGURE 4, the tire lock ring 270 is removed and the clamps released to allow the tire to be inverted. The releasing discs 26 and 28 are then again moved down into the crack between the rim edge and the tire bead, the air pressure being applied to create the braking force on the bead. At the same time in all of these operations, the entire rim and tire are being rotated by electric motor 204 acting through the driven plate 220 which drives the plate 250 around. The device as shown in FIGURE 1 is ready for the operation illustrated in FIGURE 4. If it is desired to convert to the braking of a bead on a tubeless tire, the holding devices mounted on plate 220 are removed and the frame consisting of the arms 92, 94 and 96 is pivoted into place, the rectangular end 152 of the square drive shaft 150 interlocking the recess of the drive socket 190. A tubeless tire with supporting rim or wheel can then be mounted readily on the frame, the tools inserted selectively as shown in FIGURES 14 and 15 and the central column 154 rotated again by action of the motor 204 to accomplish the desired removal or replacement of the tire.

It will be noted that the machine is operated pneumatically and mechanically so that safety devices can be installed to prevent breakage. In many machines where an operator can control the force being applied, he will force the machine to exert too great a pressure and thus cause breakage. In the present device the pressure is applied pneumatically or through power means in which safety overload devices can be readily installed, thus making it impossible for an operator to overload the machine.

We claim:

1. In a tire removing and replacing device of the type utilizing opposed discs to act on the side walls of a tire and the flange of a rim, vertical columns for supporting said discs, brackets vertically slidable in said columns, means in said columns for slidably mounting said brackets, power means for forcing said brackets downwardly in said columns and return means for moving said brackets upwardly, said brackets each having a horizontal passage therein extending to its respective column, disc supporting means comprising a horizontal bar slidable in said passage and adjustable for various positions therein, an L-shaped disc support rod comprising a vertical portion mounted in and extending downwardly from said bar and a means extending upwardly at an angle from the bottom of said downwardly extending portion having a bearing area, and a disc on said bearing area rotatable and slidable thereon.

2. A device as defined in claim 1 in which the passage in said bracket is non-circular in cross section and said horizontal bar has a cross section to conform with said passage.

3. A device as defined in claim 2 in which the horizontal bar is composed of two portions one of which is hinged relative to the other where upon withdrawal of said bar from said passage to the extent of the hinged portion permits the outward portion of said bar to be swung at an angle to said column.

References Cited in the file of this patent

UNITED STATES PATENTS

| | | |
|---|---|---|
| 1,416,094 | Krauska | May 16, 1922 |
| 1,445,784 | Mayer et al. | Feb. 20, 1923 |
| 1,538,875 | Stevens | May 19, 1925 |
| 2,065,644 | Bristol | Dec. 29, 1936 |
| 2,197,808 | Mason | Apr. 23, 1940 |
| 2,470,534 | Thomas | May 17, 1949 |
| 2,577,684 | Horne | Dec. 4, 1951 |
| 2,695,659 | Athmann | Nov. 20, 1954 |
| 2,738,002 | King | Mar. 13, 1956 |
| 2,767,781 | Lewis et al. | Oct. 23, 1956 |
| 2,812,788 | Athmann | Nov. 12, 1957 |
| 2,873,777 | Thostenson | Feb. 17, 1959 |
| 2,893,478 | Crawford | July 7, 1959 |

FOREIGN PATENTS

| | | |
|---|---|---|
| 161,851 | Australia | Mar. 10, 1955 |